April 18, 1933.  L. O. GLATZNER  1,904,132
CHANGEABLE ILLUMINATED DISPLAY
Filed April 22, 1929  3 Sheets-Sheet 1
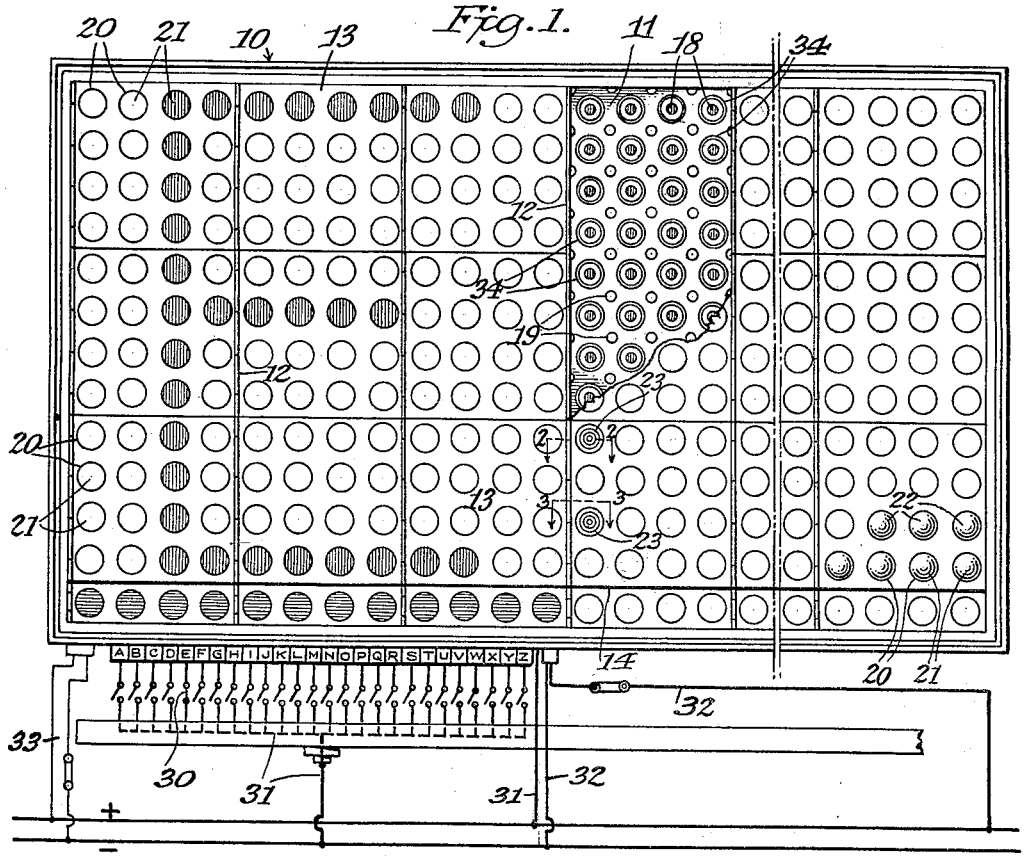
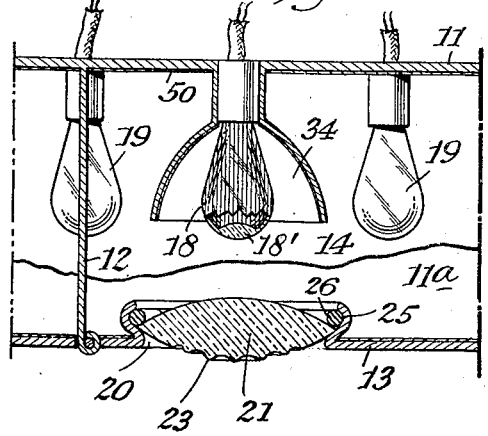
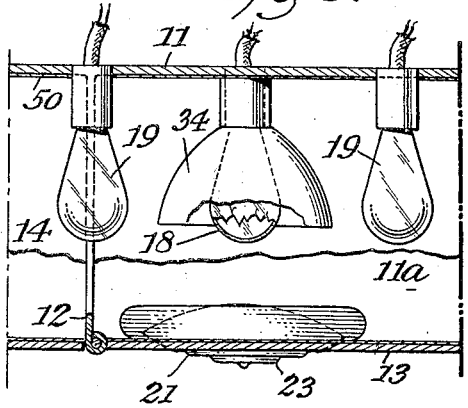
Inventor,
Louis O. Glatzner,
By Prindle Wright Neal & Bean
Attorneys.

April 18, 1933.   L. O. GLATZNER   1,904,132
CHANGEABLE ILLUMINATED DISPLAY
Filed April 22, 1929   3 Sheets-Sheet 2
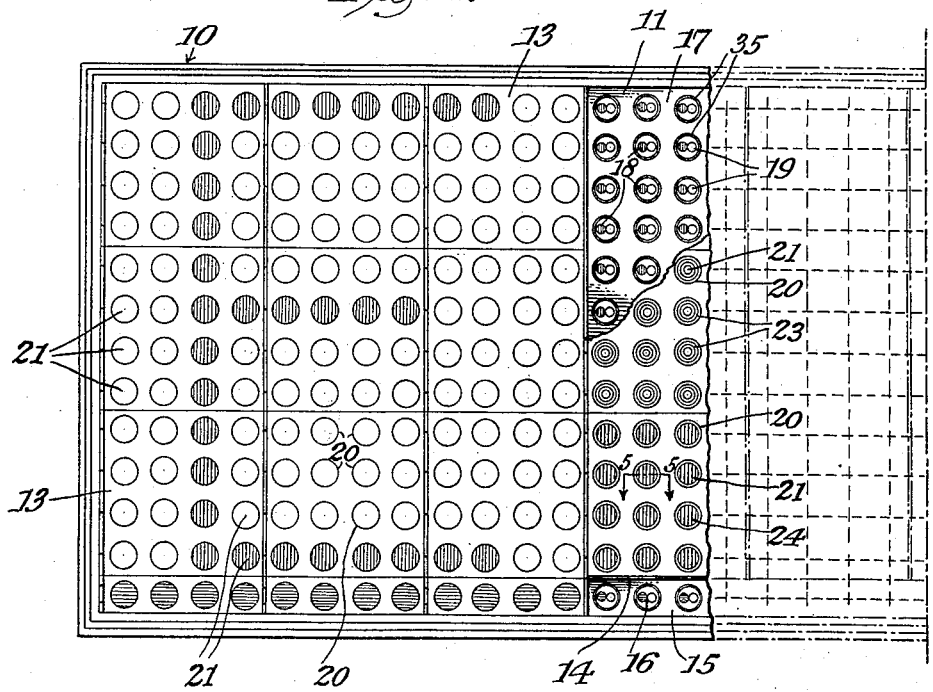
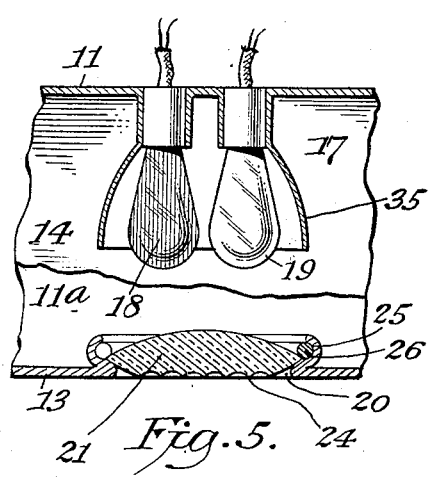
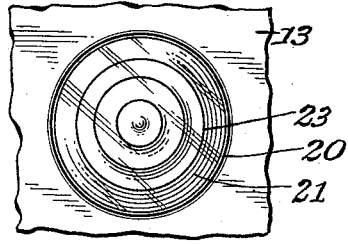
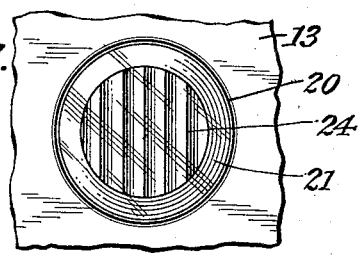
Inventor,
Louis O. Glatzner,
By Prindle Wright Neal & Bean
Attorneys.

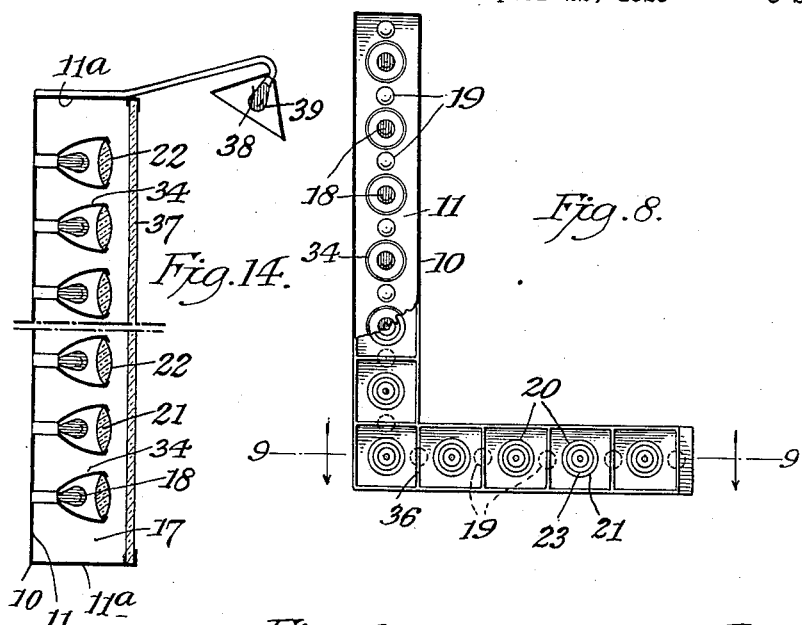
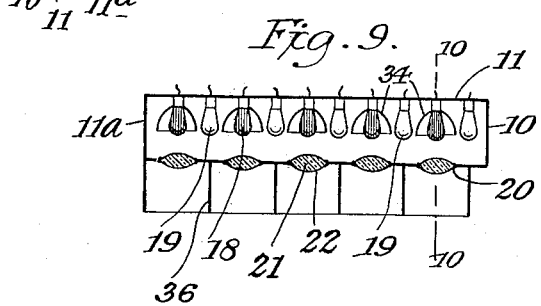
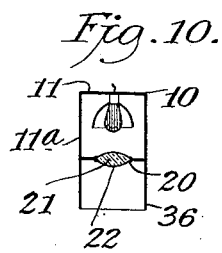
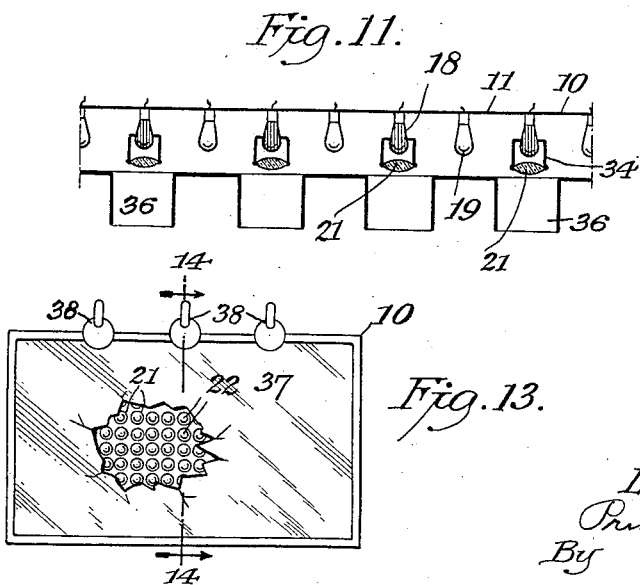
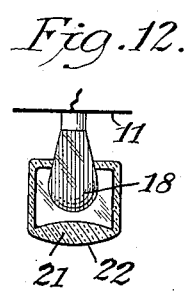

Patented Apr. 18, 1933

1,904,132

UNITED STATES PATENT OFFICE

LOUIS O. GLATZNER, OF BRISTOL, PENNSYLVANIA

CHANGEABLE ILLUMINATED DISPLAY

Application filed April 22, 1929. Serial No. 356,897.

My invention relates to illuminated apparatus useful for various purposes, such as advertising signs for general display, providing means whereby one or more letters, characters or symbols may be selectively illuminated to render the same visible to the eye in darkness, and defined with clearness and certainty for distant observation.

The invention is not confined to advertising sign display, but is equally adapted for service in aircraft, whereby signals or communications may be read from the ground when said aircraft is in flight.

The principal object of my invention is to enhance motion, color and brilliancy, whereby a dominating effect is created in competitive surroundings.

A further object is to provide means whereby "lag" in units subject to selective control may be eliminated, to increase the speed of selectivity and motion.

A further object is to provide daytime visibility for expensive displays which occupy valuable locations by assuring maximum color brilliancy and contrast. A still further object is to attract attention to the sign by frequent changes of the units as to color, affording continued novelty without any substantial changes of the construction of the display proper. Another object is to provide means whereby color, motion and brilliancy of sign borders are increased to enhance the appeal of a framed sign.

In one form of the apparatus, I employ a casing of a desired length and width divided into a number of adjoining cross chambers provided with sectional covers; and throughout the length of the casing at the bottom thereof, are narrow aligned channel chambers, also provided with covers.

In each of the cross chambers are distinct series or "gangs" of electric lamps or bulbs, one series or "gang" being subject to selective control and preferably colored and mounted within appropriate reflectors. Another series of bulbs being preferably white and in equidistant staggered relation to the colored bulbs. These white bulbs are constantly illuminated when the sign is in use. The white rays emanating therefrom serving to reduce the "lag" of the colored rays to facilitate quick changes in selected displays.

The sectional covers for the cross chambers above described may be formed with equidistant circular openings in which appropriate lenses or translucent plates may be carried, the lenses or plates being in registration or focus with the colored selective lamps in the chambers.

In another form of the lamp arrangement, the selective colored lamps may each be mounted with a white constantly illuminated lamp in a reflector, common to both, and both being in focus with the adjacent lens.

In adapting my changeable sign to successful daylight operation, I may employ sun shields surrounding or in registration with the lenses or light passages in the sign front.

To meet certain requirements in changeable signs for the purposes set forth, I may impose a translucent panel of glass, or the like, over the front of the sign casing and over the lenses, and I may employ flood lights to project various colored rays of light on the panel to attain pleasing color effects, the flood light bulbs being in contrasting color to the lenses or bulbs within the casing.

The relative arrangement of the bulbs and lens may take various forms. The lenses may be directly associated with the bulbs through the instrumentality of the reflectors which may have their edges crimped around the peripheral edge of the lens providing a bulb-lens-reflector unit; or the lens may be frictionally held in the mouth of the reflector if desired.

The lamps subject to selective control in three adjacent cross chambers, collectively constitute components of a character or symbol to be displayed. The color blending, effects and tones of the light rays emanating from said selective control bulbs may be accomplished without reflectors or lenses, if desired, by giving the selective control bulbs a brighter color and higher wattage to compensate for the brilliancy of the surrounding bulbs.

Other functions and advantages of the invention will appear from the following description taken in connection with the drawings, wherein—

Figure 1 is a front elevation, partly broken away, of my improved changeable sign and indicating a diagrammatic selective electric circuit for controlling some of the sign elements.

Figure 2 is an enlarged fragmentary section taken on the line 2—2 of Figure 1.

Figure 3 is a view similar to Figure 2, but with the section taken on the line 3—3 of Figure 1.

Figure 4 is a front elevation, partly broken away, showing a slightly modified form of changeable sign with a modified lamp arrangement.

Figure 5 is an enlarged fragmentary section taken on the line 5—5 of Figure 4.

Figures 6 and 7 are enlarged face views of modified forms of lenses which may be employed in the changeable sign.

Figure 8 is a front view partly broken away of another modified form of illuminated sign in which the casing is extended over and around the lenses to provide sun shields for successful operation of the sign in daylight.

Figure 9 is a horizontal section, partially diagrammatic, on the line 9—9 of Figure 8.

Figure 10 is a vertical, partially diagrammatic, section on the line 10—10 of Figure 9.

Figures 11 and 12 are partially diagrammatic sections showing another form of lamp arrangement in which the lenses are supported in focus with the selective lamps by their respective reflectors.

Figures 13 and 14 are front and sectional views, respectively, of another form of sign in which a translucent panel forms the front of the lamp casing 10, and flood lights are provided with lamps of a color contrasting to the color of the lamps or lenses within the casing to attain pleasing color effects.

Referring now to the particular embodiments of the invention illustrated in the drawings, 10 designates a casing of a desired length and width, comprising a back plate or panel 11, closed sides and ends 11ª, and transverse partitions or walls 12, to which sectional covers 13 may be hinged. Spaced from and parallel with the lower side of the casing and within the same is a longitudinally extending wall or partition 14, providing a series of aligned channel chambers 15, containing electric lamps 16, as shown in Figure 4 of the drawings.

The transverse partitions 12 provide adjoining cross chambers 17 containing series of two species of electric lamps or bulbs mounted on the back panel 11, one series or species of lamps 18 being under selective control, which for the purpose of this description I shall hereinafter term "selective" lamps, while the other series or species of lamps 19, being constantly illuminated when the sign is in service, I shall term "constant" or "non-selective" lamps.

As the casing is constructed, each three adjoining chambers I shall term a "character section", and the selective and non-selective lamps within each character section I shall term a "character group". As shown in the drawings, three chambers are utilized to make a character from the selective lamps. This is one form of the invention and is illustrated as one embodiment only. The number of chambers may be varied. Each character section contains selective and non-selective lamps. Switches, 30, provide means for selecting certain of the selective lamps to form different characters. A circuit, 32, is provided for the non-selective lamps.

The chamber covers, 13, of the casing are formed with preferably circular openings 20 in which are placed lenses 21, or appropriate plates for intensifying the light rays emanating from the selective lamps in focus with them. These lenses may take various forms or shapes, and may be colored, frosted, or clear glass as required or desired. For some purposes, the lenses 21 may be formed with plain convex faces 22, or with concentric circular ribs or faces 23, or said lenses may be formed with parallel cross ribs or surfaces 24, which serve to more sharply focus the rays of the selective lights to enhance the brilliancy of the sign.

To detachably secure the lenses in the openings 20 of the covers 13, I provide grooves 25 circumjacent to the said openings, and split rings or bezels 26 to engage the inner periphery faces of the lenses. This construction permits of quick replacement of the lenses when necessary.

The selective lamps 18 contained in a character group are so positioned relatively within a character section of the casing 10 that a desired letter of the alphabet, a numeral, or a symbol, may be selectively displayed by illuminating certain of said selective lamps contained in a selected electric circuit.

The series of preferably white constant lamps 19 are so positioned relative to the preferably colored selective lamps 18 that the white rays act to drown the "lag" of the said colored lamps when quick changes in the sign are made, but are not strong or intense enough to displace the colored rays when the selective lamps are illuminated.

For the purpose of illustration, I have shown in Figures 1 and 4 the letter "E" illuminated, the selectivity being accomplished through a switch 30 contained in an electric circuit 31 shown as a diagram in Figure 1. Another circuit 32 may control all of the white "constant" lamps, while a third circuit 33 may be employed to control the lamps 16 in the base channel chambers 15.

The colored lamps in the base channel members 15 are preferably of a color in contrast to the selective lamps and are used to display a base line or underline when needed or may be continued around the display to form a running border for the sign.

The sign casing 10 may be made up of a series of aligned character sections each containing a character group of lamps so that a word or words, or a series or line of symbols, numerals, or other characters, may be displayed simultaneously.

In one form of lamp arrangement, the selective lamps 18 may be mounted in sockets provided with reflectors 34.

In another form of lamp arrangement, I may mount the selective and constant lamps in pairs within reflectors 35 common to both.

I may adapt my changeable sign to successful daylight operation by employing sun shields, as shown at 36, in Figures 8, 9, 10 and 11 of the drawings, the shield being constituted by box-like extensions from the front of the casing 10, the walls thereof entirely surrounding the lenses or light openings 20.

In another form of lamp arrangement, I may mount the lenses within the open end of the reflectors, as shown in Figures 11, 12 and 14 of the drawings.

For obtaining pleasing color effects in illuminated signs, I may employ a translucent glass panel 37 as a front closure for the casing 10, and floor lights 38 having lamps 39 colored in contrast to the lamps or lenses within the casing, coatings of paint or enamel 50 may be applied to the inner faces of the casing walls to assist in intensifying the light rays passing through the lenses of the changeable sign.

The invention is designed for distant visibility and is susceptible for use during day or night for signalling, as to aircraft, or for advertising signs either on high buildings or on streets.

I desire to call particular attention to the construction shown in Figure 2. In that view, the illuminated unit or element 18 is provided with a lens 18'. This is an alternative method of increasing the brilliancy of the illumination so as to give the contrast which I have stressed hereinbefore. This provides a ready and simple means of increasing the brilliancy of the illumination wherever it is desired to bring out or emphasize any certain parts of a display by means of a contrast so far as brilliancy of illumination is concerned.

Having thus fully described the invention, what I claim as new and desire to secure by Letters Patent is:

1. A changeable sign embodying a casing divided into character sections, a group of lamps in each section, each group consisting of selective and non-selective species, and means for projecting light rays from said casing, said means comprising lenses in focus with said selective lamps.

2. A changeable sign embodying a casing divided into character sections, a group of lamps in each section, each group consisting of selective and non-selective species, and means for projecting light rays from said casing, said selective lamps bearing colors in contrast to the non-selective lamps.

3. A changeable sign embodying a casing closed at the sides and back, sectional covers for the front thereof, said covers having openings; lenses in said openings, said casing being divided into character sections, a group of lamps within each section, each group comprising a selective species and a non-selective species, the bulbs of the selective species being of a color to contrast with the bulbs of the non-selective species.

4. A changeable sign embodying a casing provided with light openings, lenses detachably held therein, said casing being divided into character sections, a group of lamps in each section, each group comprising a substantially equal number of selective and non-selective lamps, reflectors carried by the selective lamps, the bulbs of the said selective lamps being colored, the two species of lamps being arranged in relative staggered and equi-distant relation.

5. In a changeable sign a casing divided into character sections and a base channel, a group of lamps in each section, said group consisting of colored selective lamps and white non-selective lamps, a series of lamps in the base channel, the bulbs of which bearing colors contrasting to the colored bulbs of the selective lamps, and means for projecting light rays from the casing.

6. In a changeable sign, a casing divided into character sections and a base channel, a group of lamps in each section, said lamps consisting of two species, selective and non-selective, the selective lamps having intermittent service, the non-selective lamps being in constant service, the bulbs of the separate species being of contrasting color, and lenses in focus with the selective lamps only.

7. A changeable sign comprising a casing, partitions dividing said casing into a plurality of chambers, a group of said chambers forming a character section, each character section being provided with alternate rows of colored and uncolored lamps, and means for enhancing the brilliancy of the colored lamps, said means including a plurality of lenses.

8. A device of the character described, comprising, in combination, a casing, a plurality of lamps in said casing, alternate rows of said lamps being colored, means for intensifying the light rays of said colored lamps, said means including a plurality of lenses, said uncolored lamps being adapted to counteract or eliminate "lag" in the colored lamps when the colored lamps are subjected to intermittent operation.

9. A device of the character described, comprising a casing provided with character sections, each section containing a plurality of selective and non-selective lamps, means for selecting certain of said selective lamps of each section whereby different characters may be formed, and means whereby said non-selective lamps may be controlled to form a background, said selective lamps bearing colors in contrast to said non-selective lamps.

In testimony whereof I have hereto signed my name this 20 day of April, 1929.

LOUIS O. GLATZNER.